(12) United States Patent
Dawson et al.

(10) Patent No.: US 10,947,445 B2
(45) Date of Patent: Mar. 16, 2021

(54) FORMULATIONS AND METHODS

(71) Applicant: Independence Oilfield Chemicals LLC, The Woodlands, TX (US)

(72) Inventors: Jeffrey Dawson, Conroe, VT (US); Aiden Ashmore, Spring, TX (US)

(73) Assignee: INDEPENDENCE OILFIELD CHEMICALS LLC, The Woodlands, TX (US)

( * ) Notice: Subject to any disclaimer, the term of this patent is extended or adjusted under 35 U.S.C. 154(b) by 108 days.

(21) Appl. No.: 16/096,421

(22) PCT Filed: Apr. 25, 2017

(86) PCT No.: PCT/GB2017/051142
§ 371 (c)(1),
(2) Date: Oct. 25, 2018

(87) PCT Pub. No.: WO2017/187150
PCT Pub. Date: Nov. 2, 2017

(65) Prior Publication Data
US 2020/0181481 A1  Jun. 11, 2020

Related U.S. Application Data

(60) Provisional application No. 62/327,587, filed on Apr. 26, 2016.

(51) Int. Cl.
*C09K 8/64* (2006.01)
*C09K 8/68* (2006.01)
*E21B 43/26* (2006.01)

(52) U.S. Cl.
CPC ............... *C09K 8/64* (2013.01); *C09K 8/68* (2013.01); *E21B 43/26* (2013.01); *C09K 2208/28* (2013.01)

(58) Field of Classification Search
CPC ... C09K 8/80; C09K 8/68; C09K 8/70; C09K 8/36; C09K 8/805; E21B 43/267; E21B 43/26; E21B 43/04; E21B 43/16
See application file for complete search history.

(56) References Cited

U.S. PATENT DOCUMENTS 3,934,651 A * 1/1976 Nierode .................... C09K 8/76
166/282
8,211,835 B2 7/2012 Howard et al.
(Continued)

FOREIGN PATENT DOCUMENTS

WO  2014186658 A1  11/2014
WO  2016033533 A1  3/2016

OTHER PUBLICATIONS

International Search Report of PCT International App. No. PCT/GB2017/051142 dated Jul. 7, 2017 (3 pgs.).
(Continued)

*Primary Examiner* — Zakiya W Bates
(74) *Attorney, Agent, or Firm* — Shumaker, Loop & Kendrick, LLP (57) ABSTRACT

Formulations for fracturing fluids are prepared by mixing a granulated water-soluble friction reducing polymer with an invert polymer emulsion friction reducing formulation optionally in the presence of an organophilic clay, without the need for specialized field equipment. The mixture can be dosed into water to produce a fracturing fluid which is found to be technically highly advantageous and cost-effective.

19 Claims, 3 Drawing Sheets

(56) References Cited

U.S. PATENT DOCUMENTS

| | | |
|---|---|---|
| 8,640,774 B1 | 2/2014 | Frederick et al. |
| 2001/0056149 A1 | 12/2001 | Powell |
| 2007/0197711 A1 | 8/2007 | Ijdo et al. |
| 2010/0305008 A1 | 12/2010 | Dino et al. |
| 2014/0131039 A1 | 5/2014 | Reichenbach-Klinke et al. |
| 2016/0075941 A1* | 3/2016 | Duenckel ................ C09K 8/64 166/280.2 |
| 2020/0032134 A1* | 1/2020 | Frederick et al. ....... C09K 8/70 |

OTHER PUBLICATIONS

Written Opinion of the International Searching Authority of PCT International App. No. PCT/GB2017/051142 dated Jul. 7, 2017 (5 pgs.).

\* cited by examiner

FORMULATIONS AND METHODS

TECHNICAL FIELD

This invention relates to formulations and methods and particularly, although not exclusively, relates to formulations for use as friction reducers in fracturing fluids for high rate hydraulic fracturing of subterranean formations,

BACKGROUND

Hydraulic fracturing is a process used to produce oil and gas from unconventional reservoirs such as coal beds, tight sandstones and shales. In the process, a fracturing fluid is injected at a rate and pressure necessary to cause formation failure by inducing fractures or cracks in the formation. These cracks originate at the well-bore and radiate out into the formation. A common practice in unconventional reservoirs is to initiate entry into the reservoir with a small slug of acid, pumped at low rates, followed by low viscosity aqueous fluid (mainly comprising water) pumped at an increasing rate, until a designed high rate is achieved. High rates can typically range from 50 to 100 barrels per minute.

Once a treatment rate is achieved, low concentrations of propping agent or proppant are added to the fluid. Typically, most proppant comprises small-sized sand, such as 0.25 pounds of 100 mesh sand per gallon of water. As the fracturing process proceeds, the amount of sand is systematically increased and, at some point, the size of the sand may be increased to 40/70 or 30/50 mesh. The resulting sand pack formed in the fracture is orders of magnitude more permeable than the formation strata and, accordingly, the pack is able to maintain a conductive pathway from the reservoir to the well-bore for the recovery of the reservoir fluids. Proppant concentrations will normally range from 200,000 lb to 500,000 lb per fracturing stage and the water can range from 2,000 to 11,000 barrels of water. The number of fracturing stages on a horizontal well can range from 5 to 75 stages, but more commonly 10 to 50 stages, and most commonly, 15 to 40 stages.

Most treatment fluids used in newly drilled horizontal wells, are pumped through well-bore casings having 4.5 inch to 5.5 inch diameters. As a consequence of the pump rates normally used, the diameter of the casing and the viscosity and density of the fluid, the fracturing fluid exhibits a flow regime that is in turbulent rather than laminar flow. This high degree of turbulence increases the pumping pressure, commonly to levels that can exceed the casing burst pressure, which is potentially devastating to the well integrity. To address this problem and prevent the treatment fluid from reaching dangerously high pressures, small amounts (e.g. 25 to 700 ppm) of friction reducer polymer are commonly added to the fracturing fluid.

Friction reducers are typically polyacrylamide polymers or co-polymers that can be either anionically or cationically charged. A commonly used polyacrylamide co-polymer is composed of a random distribution of acrylamide and a salt of an acrylate monomer. The acrylate monomer can be a sodium, ammonium or potassium acrylate salt. When such a co-polymer is added to a fracturing fluid, the salt ionizes to leave negative charges on the polymer. These negative charges, causing charge repulsion between the acrylate groups, can increase the hydrodynamic volume of the polymer, causing an enhancement of the friction reduction characteristics. The acrylate salts contribution to the polymer can range from 0 to 50% (by molar ratio), for example between 5 and 40% and most commonly between 10 and 30%.

In addition to acrylate salts, sulfonate salts can be used for the same purpose, with the added benefit of being more tolerant to saline water. Water used in fracturing fluids may vary from relatively fresh to moderately saline. Sulfonate salts used in a polyacrylamide co-polymer are much more tolerant to salts, enabling a sulphonate based co-polymer to be used in waters containing greater than 50000 ppm chloride.

A polyacrylamide co-polymer for a fracturing fluid is commonly manufactured as an invert polymer emulsion, this having micron and sub-micron sized polymer particles dispersed in an oil carrier and stabilized with one or more non-ionic surfactants. The polymer content in the emulsion can range from 5 to 50 wt % but commonly is between 10 and 40 wt % and, most commonly, is between 15 and 30 wt %. One advantage of the invert emulsion is its operational simplicity of use during pumping operations. Typical loadings in a fracturing fluid range from 25 to 1,000 ppm, but more commonly are 50 to 500 ppm and most commonly are between 75 and 300 ppm. The most common concentration equates to a field concentration of 0.25 to 1.0 gallons of friction reducing emulsion per 1,000 gallons of fracturing fluid (referred to as "gallons per thousand" or "gpt"). The low field concentrations of 0.25 to 1.0 gpt of friction reducers added to fracturing field equipment such as a blender, and in particular, a blender tub, makes the use of the invert emulsions easy to manage.

Although easy to handle and pump, an invert emulsion is relatively expensive due, in part, to the cost of oil and surfactants used to make the emulsion. The amount of water treated with friction reducers can range from 4 to 15 million gallons and the amount of friction reducers can range from 1,000 gal to 15,000 gallons of invert emulsion per well. Consequently, the cost of the friction reducers can be a major contribution to the cost of the fracturing treatment.

Granulated polyacrylamide polymers and co-polymers are available commercially at a lower cost than invert emulsions. However, although the cost of the granulated friction reducers is substantially less, ease of use in fracturing treatments is more operationally complicated. For example, making a concentrated aqueous solution of the friction reducers, as in U.S. Pat. No. 8,211,835, to be diluted by pumping small volumes of the aqueous solution into the fracturing fluid is not practical. The friction reducers are high molecular weight water soluble polymers. When added to water and hydrated, except in very dilute concentrations, the polymers can significantly increase the viscosity of the solution. Most acrylamide polymers or co-polymers are limited in concentration up to about 3 wt % before the solution becomes too viscous to be pumped in a fracturing application. In addition, the costs of transportation, storage and handling of formulations which are mainly water, with up to 3 wt % polymer, makes the associated costs unattractive. Another disadvantage of granulates is they need to be batch or pseudo-batch processed to allow adequate time for the hydration of the concentrate—this normally takes 15 to 60 min. Because of this hydration time, addition of the granules in a continuous addition process, commonly used in fracturing treatments, is ineffective and impractical.

Another approach is to provide equipment in the vicinity of a well that can assist the metering and hydration of granulated polyacrylamide polymers or co-polymers. However, in addition to making an aqueous concentrated solution that can be difficult to pump, implementing and managing the process will be expensive, particularly when considering the cost of the equipment, fuel needed to operate the equipment, maintenance and additional personnel required. Overall operating cost can be similar to the operating cost of the invert polymer emulsion process.

SUMMARY

It follows that there is a need for a friction reducer which is less expensive in use than polyacrylamide-based invert emulsions whilst avoiding the problems of use of granulated polyacrylamide polymers or co-polymers. Furthermore, it is, of course, desirable for any new friction reducer to have performance which matches or surpasses existing reducers. In particular, it is desirable for a friction reducer to reduce friction in use as much as possible and for maximum friction reduction to be achieved rapidly, with minimum delay between mixing of the friction reducer with water of a fracturing fluid and attainment of the maximum friction reduction in the fracturing fluid. If greater friction reduction can be achieved, the speed and/or pressures generated in pumps used to inject the fracturing fluid into a formation can be reduced; or, alternatively, the speed and/or pressures generated may be maintained at a high level, with the greater friction reduction achieved leading to delivery of fracture fluid at a higher pressure at a fracture face, thereby improving fracturing performance. As a result, it may be possible to reduce the number of fracture stages required in fracturing a subterranean formation.

BRIEF DESCRIPTION OF THE FIGURES

Specific embodiments of the invention will now be described, by way of example, with reference to the accompanying figures, in which.

DETAILED DESCRIPTION

It is an object of preferred embodiments of the present invention to address the above described problems.

It is an object of preferred embodiments to provide a formulation for use in friction reduction which is less expensive than a comparable polyacrylamide invert emulsion and/or is advantageous over use of granulated polyacrylamides.

It is an object of preferred embodiments to provide a formulation which relatively rapidly inverts in use so its friction reducing effect is not significantly delayed in use after contact with water used in the fracturing process.

It is an object of preferred embodiments to provide a formulation which produces a high level of friction reduction.

According to a first aspect of the invention, there is provided a formulation (A), for example for use in a fracturing fluid, the formulation (A) comprising:

(i) a fluid (D) comprising an oil phase; and (ii) particles of a water-soluble polymer (C).

Unless otherwise stated herein, a reference to "ppm" refers to "parts-per-million by weight"; and "wt %" refers to the % of a component on a weight-for-weight basis.

Said particles of said polymer (C) are preferably dispersed in said oil phase, suitably as solid discrete particles.

The fluid (D) may be any fluid which includes a chemical additive for use in a fracturing fluid. For example, said fluid (D) may include any additive which it is desired to include in a fracturing fluid, for example selected from friction reducers (e.g. water soluble polymers), corrosion inhibitors, proppant particulates, acids, fluid loss control additives, biocides, surfactants and scale inhibitors, clay control additives, foamers, paraffin inhibitors, gelling agents, pH adjustment additives, buffers, cross-linkers, oxidizing agents, enzymes and gel degrading agents. Said fluid (D) preferably includes a friction reducer, for example a water-soluble polymer.

Said fluid (D) is preferably an inverse emulsion comprising water-soluble polymer (B) and said oil phase. Said polymer (B) preferably includes acrylamide repeat units.

As hereinafter described, formulation (A) may be technically advantageous relative to comparable formulations since it inverts rapidly on contact with water of a fracturing fluid (so the time to deliver target friction reduction may be relatively low); and it produces higher friction reduction. Additionally, formulation (A) may be cheaper to manufacture and purchase compared, for example to a formulation consisting of an inverse emulsion alone which includes a comparable level of friction reducing additive, for example a polymer comprising acrylamide repeat units. However, since the equipment used to manipulate and deliver formulation (A) to produce a fracturing fluid is the same as used for a formulation consisting of an inverse emulsion, there are no additional costs involved in using the formulation (A). In addition, the formulation (A), because of its rapid polymer hydration, can be used in a continuous addition process. Advantages of preferred formulations are described in the specific examples which follow.

Preferably, the formulation (A) is for addition to an aqueous liquid, for example water, to produce a fracturing fluid which can be used in fracturing a subterranean formation. The formulation (A) is suitably used to reduce the coefficient of friction of the aqueous liquid during turbulent flow, for example during hydraulic fracturing of a subterranean formation. As a consequence, a pump used to inject a fracturing fluid may be operated at a reduced speed and/or pressure; or for a given pump pressure, more pressure from the pump may be conveyed to the fracture face. The formulation (A) is suitably used to lower the friction or drag by suppressing the turbulence present in high velocity gradient water of said fracturing fluid and, consequently, the water can be pumped at higher rates. The formulation (A) may also reach its maximum level of friction reduction very rapidly.

Said fluid (D), for example said inverse emulsion, may comprise at least 15 wt %, preferably at least 25 wt %, of said oil phase. The formulation (A) may include less than 70 wt % or less than 50 wt % of said oil phase. Polymer (B) is suitably dispersed in the oil phase.

Said fluid (D), for example said inverse emulsion may comprise at least 15 wt %, preferably at least 25 wt % of polymer (B). It may include less than 50 wt % or less than 40 wt % of polymer (B). The aforementioned amount of polymer (B) is suitably on a dry matter basis.

Polymer (B) is suitably hydrated. For example polymer (B) may incorporate up to 70 wt %, 60 wt %, 50 wt % or 40 wt % water. Polymer (B) suitably includes at least 10 wt %, at least 14 wt % or at least 20 wt % water. In said fluid (D), for example said inverse emulsion, polymer (B) is suitably a hydrated polymer which is dispersed within the oil phase. The hydrated polymer is suitably in the form of micron or sub-micron particles (e.g. 0.1-100 μm, preferably 0.5 to 10 μm). The inverse emulsion suitably includes a surface active agent to stabilise the emulsion.

Said fluid (D), for example said inverse emulsion may comprise at least 15 wt % water, preferably at least 20 wt % water. It may include less than 40 wt % water. The water may hydrate polymer (B).

In a preferred embodiment, said fluid (D), for example said inverse emulsion includes 15-40 wt % of said oil phase, 15-40 wt % of polymer (B) and 15-40 wt % of water. Said fluid (D) may include 1-10 wt % of surface active agent(s) as herein described.

Preferably, said polymer (B) is an ionic polyacrylamide. Polymer (B) may include 0-50 mol %, preferably 5-40 mol %, more preferably 10-30 mol % of ionic repeat units. The balance suitably comprises non-ionic acrylamide repeat units. Whilst polymer (B) may be an anionic or cationic polyacrylamide, it is preferably an anionic polyacrylamide. Polymer (B) may be partially hydrolysed acrylamide.

Said polymer (B) preferably includes a repeat unit which includes an optionally substituted acrylamide, for example an alkylacrylamide (e.g. methacrylamide) or N,N-dialkylacrylamide (e.g. N,N-dimethylacrylamide). Said optionally-substituted acrylamide may be of formula I wherein $R^5$, $R^6$ and $R^7$ independently represent a hydrogen atom or an optionally-substituted (preferably unsubstituted) $C_{1-4}$ alkyl, preferably $C_{1-2}$ alkyl, more preferably a methyl group.

In formula I, $R^5$, $R^6$ and $R^7$ preferably represent hydrogen atoms.

On average, the ratio of the number of other repeat units in polymer (B) divided by the number of repeat units of formula I may be less than 0.6, 0.5, 0.4, 0.3 or 0.2. Said ratio may be at least 0.0025, at least 0.005, at least 0.05 or at least 0.1.

Said polymer (B) may include (e.g. in combination with repeat unit of formula I) a repeat unit which includes an acrylate or sulfonate moiety, for example an acrylate or sulfonate salt, or a pyrrolidone moiety. Polymers which include sulfonate salts may be preferred when the formulation is used with water which includes high levels of hardness ions, for example magnesium, calcium, strontium, barium or ferrous ions.

Said polymer (B) may include a repeat unit of formula I in combination with:
a repeat unit comprising a moiety of formula II wherein the O* moiety is an $O^-$ moiety or is covalently bonded to another atom or group;
a repeat unit comprising a vinyl pyrrolidone moiety; or
a repeat unit comprising a moiety of formula III wherein $R^1$ and $R^2$ are independently selected from a hydrogen atom and an optionally-substituted alkyl group. An optionally-substituted alkyl group may define an electrically neutral hydrophobe. An optionally-substituted alkyl group may incorporate an $—SO_3R^3$ moiety wherein $R^3$ is selected from a hydrogen atom and a cationic moiety, for example an alkali metal cation, especially $Na^+$. Said optionally-substituted alkyl group may include 1 to 36, preferably 1 to 20, more preferably 1 to 10 carbon atoms. Said repeat unit may be derived from and/or based on AMPS.

Polymer (B) may be derived from one or more of the following monomers:
Cationic monomers—Methacryloyloxyethyltrimethylammonium chloride, Methacrylamidopropyltrimethylammonium chloride, Acryloyloxyethyltrimethylammonium chloride, Dimethyldiallylammonium chloride;
Anionic monomers—Sodium Acrylate, Sodium 2-Acrylamido-2-methylpropane sulfonate;
Non-ionic Monomers—Acrylamide, Methacrylamide, N,N Dimethylacrylamide, Vinyl pyrolidonone.

Polymer (B) may include monovalent (e.g. $NH_4^+$, $Li^+$, $Na^+$, $K^+$, $Rb^+$ or $Cs^+$), divalent (e.g. $Be^{2+}$, $Mg^{2+}$, $Ca^{2+}$, $Sr^{2+}$, $Ba^{2+}$, $Fe^{2+}$, $Cu^{2+}$ or $Zn^{2+}$) or trivalent (e.g. $Fe^{3+}$ or $Al^{3+}$) cations. It preferably includes monovalent cations, with $Na^+$ being preferred.

Said polymer (B) preferably includes acrylamide repeat units and acrylate, for example sodium acrylate, repeat units.

Said polymer (B) may have a molecular weight of at least 200,000 Daltons, suitably at least 500,000 Daltons, preferably at least 1,000,000 Daltons. The molecular weight may be less than 50,000,000 Daltons or less than 30,000,000 Daltons. Molecular weight, described herein, may be measured by Measurement of Intrinsic Viscosity (see ISO 1628/1-1984-11-01); and using Intrinsic Viscosity/Molecular Weight Correlation via the Mark-Houwink Equation.

Fluid (D) may be selected from a wide range of emulsion type polyacrylamides including, for example, KemFlow A-4251, KemFlow A4355, KemFlow A-4356, KemFlow A-4358, KemFlow A-4361. KemFlow A-4366 (Kemira, Atlanta, Ga., USA); FLOJET DR-7000FLOJET DR-3046 (SNF, Riceboro, Ga., USA); Sedifloc 320A, and Sedifloc, 331A (3F Chimica, Charlotte, N.C., USA) containing anionic; and Alcomer-788 and Alcomer-889 (BASF, Florham Park, N.J., USA) as cationic polyacrylamide emulsions.

Said oil phase of formulation (A) suitably comprises a hydrophobic liquid which is suitably inert. Said hydrophobic liquid may be a hydrocarbon. It may be selected from paraffinic hydrocarbons, napthenic hydrocarbons, aromatic hydrocarbons, benzene, xylene, toluene, mineral oils, diesel oil, kerosenes, naphthas (including hydrotreated naphtha), petrolatums, branch-chain isoparaffinic solvents, branch-chain hydrocarbons, saturated, linear, and/or branched paraffin hydrocarbons and combinations thereof. Said liquid may include a natural, modified or synthetic oil; or a vegetable oil such as canola oil, coconut oil, rapeseed oil and the like.

When said fluid (D), for example said inverse emulsion, is stabilised by a surface active agent, said surface active agent may have an HLB (hydrophilic-lipophilic balance) value between 2 and 10, in some cases between 3 and 9 and in other cases between 3 and 7.

As used herein, HLB is calculated using the art known method of calculating a value based on the chemical groups of the molecule. The method uses the following equation:

$$HLB = 7 + m*Hh + n*Hl$$

where m represents the number of hydrophilic groups in the molecule, Hh represents the value of the hydrophilic groups, n represents the number of lipophilic groups in the molecule and Hl represents the value of the lipophilic groups.

Non-limiting examples of suitable surface active agents include:
fatty acid esters of mono-, di- and polyglycerols, for instance the monoleate, the dioleate, the monostearate, the distearate and the palmitostearate. These esters can be prepared, for example, by esterifying mono-, di- and polyglycerols, or mixtures of polyhydroxylated alcohols such as ethylene glycol, diethylene glycol, dipropylene glycol, 1,4-butanediol, 1,2,4-butanetriol, glycerol, trimethylolpropane, sorbitol, neopentyl glycol and pentaerythritol;
fatty acid esters of sorbitan, for instance sorbitan monoleate, sorbitan dioleate, sorbitan trioleate, sorbitan monostearate and sorbitan tristearate;
fatty acid esters of mannitol, for instance mannitol monolaurate or mannitol monopalmitate;
fatty acid esters of pentaerythritol, for instance pentaerythritol monomyristate, pentaerythritol monopalmitate and pentaerythritol dipalmitate;
fatty acid esters of polyethylene glycol sorbitan, more particularly the monooleates;
fatty acid esters of polyethylene glycol mannitol, more particularly the monooleates and trioleates;
fatty acid esters of glucose, for instance glucose monooleate and glucose monostearate;
trimethylolpropane distearate;
the products of reaction of isopropylamide with oleic acid;
fatty acid esters of glycerol sorbitan;
ethoxylated alkylaines;
sodium hexadecyl phthalate;
sodium decyl phthalate; and
oil-soluble alkanolamides.

Suitable active agents include those sold under the trade marks SPAN™ and TWEEN™.

The total amount of surface active agents in said fluid (D), for example said inverse emulsion, may be at least about 0.1 wt %, at least 0.5 wt %, or at least 1 wt %. The total may be 10 wt % or less than 5 wt % or less than 2.5 wt %.

Water soluble polymer (C) is preferably substantially insoluble in the oil phase of said fluid (D), for example said inverse emulsion. It is preferably soluble in water, for example at a concentration of at least 10, 20 or 30 wt %.

Said water soluble polymer (C) preferably includes oxygen atoms; it is preferably capable of hydrogen bonding with water.

Said water soluble polymer (C) may include one or more moieties, suitably in a repeat unit, selected from —C(O)NH$_2$, —COO$^-$, —O— and quaternary ammonium, for example alkyl quaternary ammonium, such as in —N$^+$(CH$_3$)$_3$ moieties. Moiety —C(O)NH$_2$ may be part of an acrylamide repeat unit. Moiety —COO$^-$ may be part of an acrylate (e.g. a salt of an acrylic acid) repeat unit. Moiety —O— may be part of an ether or a hydroxyl moiety.

In one embodiment, said polymer (C) is poly(ethylene oxide). It may have a weight average molecular weight between 100,000 and 20,000,000 Daltons, for example from 1,000,000 to 10,000,000 Daltons.

In a preferred embodiment, said polymer (C) includes an acrylamide repeat unit. It is preferably a polyacrylamide and, more preferably, is a partially hydrolysed polyacrylamide. Preferably, polymer (C) is an ionic polyacrylamide. Polymer (C) may include 0-50 mol %, preferably 5-40 mol %, more preferably 10-30 mol % of ionic repeat units. The balance suitably comprises non-ionic acrylamide repeat units. Whilst polymer (C) may be an anionic or cationic polyacrylamide, it is preferably an anionic polyacrylamide.

Said polymer (C) preferably includes a repeat unit which includes an acrylamide, for example of formula I described above.

On average, the ratio of the number of other repeat units in polymer (C) divided by the number of repeat units of formula I may be less than 0.6, 0.5, 0.4, 0.3 or 0.2. Said ratio may be at least 0.0025, at least 0.005, at least 0.05 or at least 0.1.

Said polymer (C) may include a repeat unit which includes an acrylate, sulfonate or pyrrolidone moiety, for example an acrylate or sulfonate salt. Polymers which include sulfonate salts may be preferred when the formulation is used with water which includes high levels of hardness ions, as described above.

Said polymer (C) may include a repeat unit of formula I as described above in combination with:
a repeat unit comprising a moiety of formula II as described above; or
a repeat unit comprising a vinylpyrrolidone moiety; or
a repeat unit comprising a moiety of formula III as described above;
wherein R$^1$ and R$^2$ are independently selected from a hydrogen atom and an optionally-substituted alkyl group. An optionally-substituted alkyl group may define an electrically neutral hydrophobe. An optionally-substituted alkyl group may incorporate an —SO$_3$R$^3$ moiety wherein R$^3$ is selected from a hydrogen atom and a cationic moiety, for example an alkali metal cation, especially Na$^+$. Said optionally-substituted alkyl group may include 1 to 36, preferably 1 to 20, more preferably 1 to 10 carbon atoms.

Polymer (C) may be derived from one or more of the following:
Cationic monomers—Methacryloyloxyethyltrimethylammonium chloride, Methacrylamidopropyltrimethylammonium chloride, Acryloyloxyethyltrimethylammonium chloride, Dimethyldiallylammonium chloride;
Anionic monomers—Sodium Acrylate, Sodium 2-Acrylamido-2-methylpropane sulfonate;
Non-ionic Monomers—Acrylamide, Methacrylamide, N,N Dimethylacrylamide, Vinyl pyrolidonone.

Polymer (C) may include monovalent (e.g. NH$_4^+$. Li$^+$, Na$^+$, K$^+$, Rb$^+$ or Cs$^+$), divalent (e.g. Be$^{2+}$, Mg$^{2+}$, Ca$^{2+}$, Sr$^{2+}$, Ba$^{2+}$, Fe$^{2+}$, Cu$^{2+}$ or Zn$^{2+}$) or trivalent (e.g. Fe$^{3+}$ or Al$^{3+}$) cations. It preferably includes monovalent cations with Na$^+$ being preferred.

Said polymer (C) preferably includes acrylamide repeat units and acrylate, for example sodium acrylate, repeat units.

Said polymer (C) may have a molecular weight of at least 200,000 Daltons, suitably at least 500,000 Daltons, preferably at least 1,000,000 Daltons. The molecular weight may be less than 50,000,000 Daltons or less than 30,000,000 Daltons. Molecular weight may be measured as described above.

Examples of polymer (C) include solid (powderous) polyacrylamides including KemFlow A-5156, KemFlow A-5157, KemFlow A-5251, KemFlow A-5252. KemFlow A-5253, KemFlow A-5254, KemFlow A-5351, KemFlow A-5352, KemFlow A-5353, KemFlow A-5354, KemFlow A-5356 (Kemira, Atlanta, Ga., USA); Sedifloc 7030HM, Sedifloc 7030HHM (3F Chimica, Charlotte, N.C., USA).

As described above, said particles of said polymer (C) are preferably dispersed in said oil phase, suitably as solid discrete particles. The particles may be in the form of powder, granules or flake. Unless otherwise stated, particles sizes are measured as hereinafter described. Said particles preferably have a mean particle diameter of at least 100 µm, at least 200 µm or at least 300 µm. Said mean particle diameter may be less than 1000 µm, for example less than 700 µm or less than 500 µm.

At least 90 wt %, preferably at least 98 wt %, more preferably about 100 wt % of said particles of said water soluble polymer (C) have a diameter greater than 1 µm, greater than 10 µm or greater than 20 µm. Said particles of said water soluble polymer (C) suitably have a diameter less than 2000 µm, or less than 1100 µm.

Said particles preferably include at least 85 wt %, preferably at least 95 wt % of said polymer (C). Said particles may include less than 15 wt %, preferably less than 5 wt % water.

In formulation (A), a ratio (X) defined as the parts by weight (hereinafter pbw) of said fluid (D) (e.g. said inverse emulsion) divided by the pbw of said particles is suitably in the range 1 to 12, preferably in the range 2 to 10, more preferably in the range 3 to 8.

In formulation (A), a ratio (Y) defined as the pbw of polymer (B) divided by the pbw of polymer (C) is suitably in the range 5:1 to 1:5, preferably 3:1 to 1:3, more preferably in the range 2:1 to 1:2.

In formulation (A), a ratio (Z) defined as the pbw of said oil phase divided by the pbw of polymer (C) is suitably in the range of 0.1 to 2, preferably in the range 0.1 to 1.2, more preferably in the range 0.3 to 1.0.

Said formulation (A) may include a suspending agent to facilitate suspension of said granules in the formulation. Said formulation may include less than 1 wt %, for example less than 0.75 wt % of suspending agent. It may include at least 0.1 wt % of suspending agent.

Said suspending agent may be organophilic. It is suitably insoluble in formulation (A). It is preferably a clay, for example an organophilic clay.

The organophilic clay, which associates with oily surfaces and rejects aqueous surfaces, may be the reaction product of purified smectite clay (such as hectorite, bentonite, attapulgite, sepiolite, montmorillonate, etc.) and a quaternary ammonium salt. It includes coated clay (or lignite) such as clay coated with a fatty-acid quaternary amine. The coating imparts dispersability of the clay in the oil. Exemplary organophilic clays include those disclosed in U.S. Patent Publication No. 20070197711 and U.S. Patent Publication No. 20100305008, herein incorporated by reference. Included here are organo bentonites such as BENTONE® clays of Elementis Specialties, Inc. and Claytone SF, a product of Southern Clay Products. Further, such organophilic clays may be ion exchanged clays; see, for instance, U.S. Patent Publication No. 20010056149, herein incorporated by reference.

Said formulation (A) may have a viscosity, measured as described hereinafter, of less than 1000 cP. The viscosity may be at least 200 cP.

Viscosity is suitably measured at 511 sec$^{-1}$ with a Fann Model 35 type viscometer with an F1 spring, B1 bob, and R1 rotor at (25° C. and a pressure of 1 atmosphere).

The sum of the wt % of said fluid (D), for example said inverse emulsion and the wt % of said particles in formulation (A) may be at least 80 wt %, at least 90 wt % or at least 95 wt %. The balance may include for example a said suspending agent and/or other additives conventionally used in fracturing fluids, for example biocides.

In a preferred embodiment, said formulation (A) includes:
70 to 90 wt % of said fluid (D), for example said inverse emulsion;
10 to 30 wt % of said particles; and
0 to 1 wt % of suspending agent.

The formulation (A) may include less than 1 wt % of a surfactant; and may include at least 0.01 wt % of a surfactant.

The formulation (A) is preferably contacted with water to produce a fracturing fluid. Thus, the invention extends, in a second aspect, to a method of making a fracturing fluid, the method comprising contacting formulation (A) with water. As a result of the contact and/or mixing of formulation (A) with water, the inverse emulsion inverts and polymer (A) mixes with and/or is solubilised by the water. The fracturing fluid so formed exhibits a lower friction in use compared to that of water alone (and compared to use of, for example, an inverse emulsion comprising polymer (B), in the absence of particles of polymer (C)) and/or such lower friction may be achieved rapidly on contact between formulation (A) and water.

Advantageously, it is found that said formulation (A) can readily be dispersed in the fracturing fluid without forming lumps of particles of polymer (C).

Water which is mixed with formulation (A) and/or which forms the major part of a fracturing fluid described herein may be derived from any convenient source. It may be potable water, surface water, sea water, brine, flow-back water, aquifer water or produced water. References herein to amounts of water, particularly in the context of water which forms a major part of a fracturing fluid described, suitably refer to water inclusive of components present in the source of water, such as dissolved salts found in sea water.

The method may comprise making a fracturing fluid which includes 25 to 5,000 ppm, 25 to 1000 ppm or 250 to 1000 ppm of formulation (A) in an aqueous liquid, for example water.

In the method, other additives may be contacted with formulation (A) after and/or concurrently with water. Said other additives may be selected from corrosion inhibitors, proppant particulates, acids, fluid loss control additives, biocides, surfactants and scale inhibitors, clay control additives, foamers, paraffin inhibitors, gelling agents, pH adjustment additives, buffers, cross-linkers, oxidizing agents, enzymes and gel degrading agents.

Preferably, at some stage in the method, one or a plurality of proppants is incorporated into the fracturing fluid. The proppant may have a size of at least 140 US Mesh; it may have a size of less than 5 US Mesh. The proppant may be selected from sand, bauxite, and man-made intermediate or high strength materials. The proppant is arranged to restrict close down of a fracture on removal of hydraulic pressure which caused the fracture.

Preferably, at some stage in the method, said fracturing fluid includes 2.9 to 54 wt %, for example 5 to 40 wt %, of proppants.

According to a third aspect of the invention, there is provided a fracturing fluid (e.g. a slick water fracturing fluid), said fracturing fluid comprising:
water soluble polymer (B);
water soluble polymer (C);
a hydrophobic liquid, suitably derived from said fluid (D) (e.g. said inverse emulsion) as described in the first aspect; and
water.

Said fracturing fluid may be made as described in the second aspect. Said water soluble polymer (B), said water-soluble polymer (C) and said hydrophobic liquid may be as described in the first aspect. Said fracturing fluid may include any component included in formulation (A) of the first aspect from which it may be derived.

Said fracturing fluid (disregarding any and all proppant that may be included in the fluid) may include at least 99 wt % water.

According to a fourth aspect of the invention, there is provided a method of fracturing a subterranean formation, the method comprising contacting the formation with a fracturing fluid made in a method of the second aspect and/or as described in the third aspect.

Said method preferably comprises fracturing a subterranean formation penetrated by a well by pumping into the well at a pressure sufficient to create a fracture network the fracturing fluid.

According to a fifth aspect of the invention, there is provided a method of manufacturing a formulation (A) according to the first aspect, the method comprising:
(a) selecting a fluid (D) comprising an oil phase (e.g. an inverse emulsion comprising an oil-phase and a water-soluble polymer (B)); and
(b) contacting said fluid (D) (e.g. said inverse emulsion) with particles of a water-soluble polymer (C).

Except for any water associated with said fluid (D) (e.g. said inverse emulsion), said method is preferably carried out in the presence of less than 5 wt % water. Suitably, no water is mixed with said fluid (D) (e.g. said inverse emulsion) and polymer (C) in the method.

Advantageously, it is found that said particles of polymer (C) can readily be dispersed in fluid (D) without forming lumps of particles of polymer (C).

According to a sixth aspect of the invention, there is provided an assembly positioned adjacent a subterranean formation and arranged to deliver a fracturing fluid into the formation, said assembly comprising:
(I) a receptacle containing formulation (A) according to the first aspect;
(II) a water supply;
(III) a pump (PI) for dosing formulation (A) from said receptacle into said water supply, suitably to define at least part of a fracturing fluid;
(IV) a conduit for delivering fracturing fluid into the formation; and
(V) a pump (P2) for injecting the fracturing fluid via said conduit into the formation.

Any aspect of any invention described herein may be combined with any feature described in any other aspect of any invention or embodiment described herein mutatis mutandis.

WORKING EXAMPLES

The following materials are referred to hereinafter:

Emulsion polymer (EP)—commercially available emulsion friction reducer composition supplied as HiRate 605 available from Independence Oilfield Specialties and comprising approximately 20 wt % of an anionic partially hydrolysed polyacrylamide copolymer, present as an inverse emulsion with water and surfactant in approximately 25 wt % of a continuous oil phase comprising a hydro treated light petroleum distillate.

Organophilic Clay (OC)—Claytone SF from BYK

Figure 1:
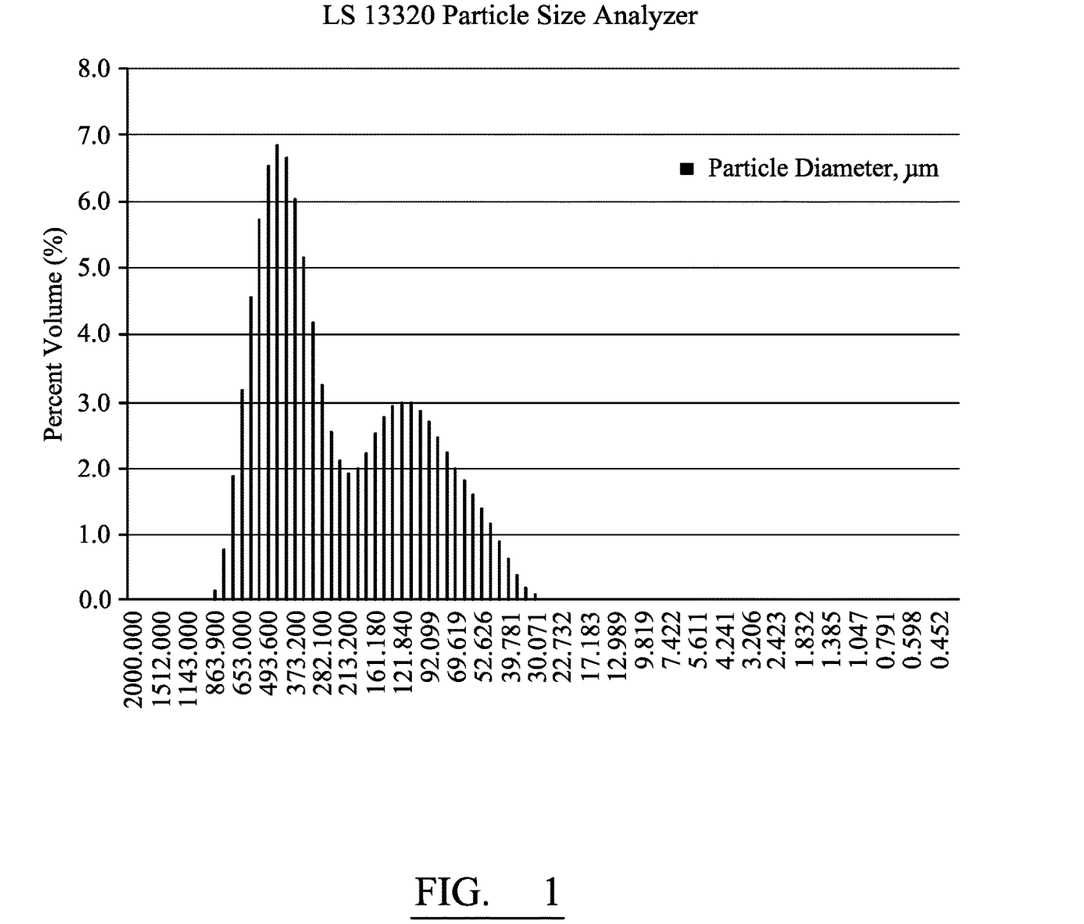
FIG. 1 is a particle size distribution graph (percent volume v. particle diameter (μm)) for Granule Polyacrylamide (GP)

Granule polyacrylamide (GP)—commercially available particulate friction reducer composition comprising >90% of an anionic partially hydrolysed polyacrylamide copolymer. Particle size analysis of the material is provided in FIG. 1. Analysis was performed using a Beckman Coulter Laser Particle Size Analyser LS13320. The material has a volume median particle diameter of 320.8 µm, a volume mean particle diameter of 323.2 µm, the largest particles being 948 µm and the smallest being 27.4 µm Test Water (W)—refers to tap water having the following composition.

| Ions | Concentration (mg/L) |
| --- | --- |
| Calcium | 13.80 |
| Magnesium | 1.64 |
| Barium | 0.05 |
| Boron | 0 |
| Iron | 0 |
| Sodium | 244.56 |
| Chloride | 226.27 |
| Sulphate | 16.50 |
| Phosphates | 0.06 |
| Bicarbonate | 280.60 |
| Carbonate | 6.40 |
| Potassium | 2.93 |
| Silicon | 9.42 |
| pH | 8.90 |
| Specific Gravity | 1.00 |
| Total Dissolved Solids (ppm) | 811.64 |

In general terms, formulations for fracturing fluids are prepared by mixing a granulated water-soluble friction reducing polymer (Granule polyacrylamide (GP)) with an invert polymer emulsion friction reducing formulation (Emulsion Polymer (EP)), optionally in the presence of an organophilic clay, without the need for specialized field equipment. The mixture can be dosed into water to produce a fracturing fluid which is found to be technically highly advantageous and cost-effective.

Example 1 describes the preparation of candidate formulations for testing, Example 2 describes a general procedure for Flow-loop testing. Examples 3 to 6 describe assessments undertaken and results for a range of formulations.

EXAMPLE 1

Preparation of Candidate Formulations for Testing

The following blends A-1, A-2, A-3 and B-1 were prepared by blending the components described in the table at the level indicated to produce slurries having densities and viscosities as detailed in Table 1. In general terms, in the method, the clay is added to Emulsion Polymer (EP) to disperse and activate the clay. The Granule Polyacrylamide (GP) is added and mixture stored at ambient temperature and pressure.

TABLE 1

| Formulation Identifier. | Density (lb/gal) | Emulsion Polymer (EP) (wt %) | Organo-philic Clay (OC) (wt %) | Granule Poly-acrylamide (GP) ((wt %)) | Slurry Viscosity (cP) |
|---|---|---|---|---|---|
| Blend A-1 | 8.942 | 79.30 | 0.51 | 20.19 | 378 |
| Blend A-2 | 8.946 | 79.42 | 0.35 | 20.22 | 349 |
| Blend A-3 | 8.937 | 79.61 | 0.20 | 20.18 | 340 |
| Blend B-1 | 8.875 | 81.55 | 0.35 | 18.11 | 320 |

EXAMPLE 2

General Procedure for Flow-Loop Testing of Formulations

A flow loop device used was composed of two 10 ft pipes in sequence, one ¾ inch and the other ½ inch. The water for the test was held in a 5 gallon reservoir tank, equipped with an overhead stirrer. The fluid was recirculated through the pipes and reservoir using a Moyno pump. The flow rate in each test was held constant at either 6 or 10 gal/min. Initially, Test Water (W) was pumped for two minutes at constant rate to establish a baseline. After two minutes, a friction reducer to be tested was added to the reservoir tank with 30 seconds of vigorous mixing to assure uniform distribution of friction reducer while also flowing through the flow loop plumbing. After the 30 seconds of vigorous mixing, the stirrer speed was reduced to gently mix components for the rest of the test.

The pressure drop across the length of each pipe, the flow rate through each pipe and the fluid temperature was continuously recorded, with data being collected at a rate of one data point per second. Each test was run for about 18 minutes. At the completion of each test, the flow rate, temperature and the percent friction reduction (calculated as $1-(\Delta P\ FR/\Delta P\ water)$), were plotted against time.

EXAMPLE 3

Assessment of Formulations (First Set of Experiments)

In the first set of experiments, testing of formulations detailed in the Table 2 below was undertaken using the flow loop of Example 2, at a flow rate of 6 gal/min.

TABLE 2

| Example No. | Formulation Identifier | Loading (gpt) | Viscosity (cP) | pH | Inversion Time (sec) | Max % Friction Reduction |
|---|---|---|---|---|---|---|
| 3a (Comparative) | Emulsion Polymer (EP) | 0.50 | 1.13 | 8.05 | 62 | 73 |
| 3b (Comparative) | Emulsion Polymer (EP) | 0.25 | 0.98 | 8.09 | 70 | 69 |
| 3c | Blend A-1 | 0.25 | 1.17 | 8.02 | 22 | 73 |
| 3d | Blend A-2 | 0.25 | 1.17 | 8.00 | 21 | 73 |
| 3e | Blend A-3 | 0.25 | 1.16 | 8.03 | 22 | 73 |

Note that "gpt" refers to "gallons per thousand gallons" which is conventional in the art..

Figure 2:
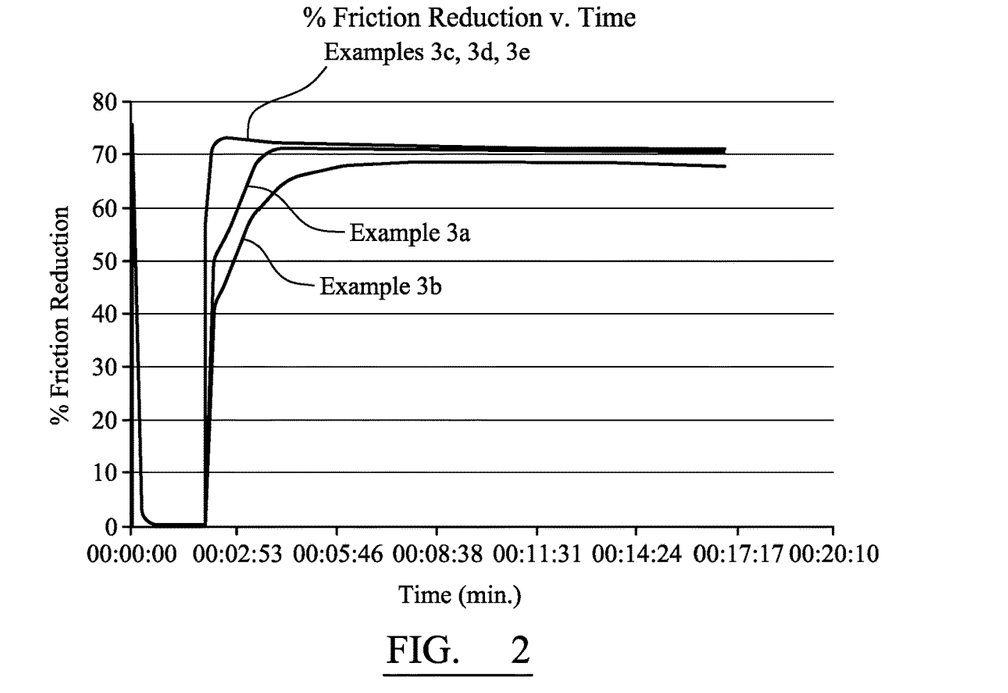
FIG. 2 is a graph of % Friction Reduction v. time for formulations described in Example 3.

Results of the flow loop test are provided in Table 1 and in FIG. 2. The results show that the maximum friction reduction for the base line 0.50 gpt (Example 3a) was 73%, and the inversion time was 62 sec. When half the amount, 0.25 gpt in Example 3b was compared, the maximum reduction was only 69% and the inversion time was 70 sec. However, by incorporating varying amounts of powdered friction reducer polymer (i.e. Granule Polyacrylamide (GP)) in the Emulsion Polymer (EP) as described in Examples 3c, 3d and 3e, the maximum friction reduction is 73% and the inversion time is significantly faster (21-22 sec) compared to the Example 3b formulation which does not include the Granule Polyacrylamide (GP), but only includes Emulsion Polymer (EP).

FIG. 2 illustrates the slower inversion rates of the Example 3a and 3b formulations compared to the formulations of Examples 3c to 3e, which include various amounts of Granule Polyacrylamide (GP). In addition, the Example 3c to 3e formulations, each of which contains about 20 wt % powdered polyacrylamide and varying amounts of organophilic clay, show near identical performance with all three curves in FIG. 2 lying on top of one another.

EXAMPLE 4

Assessment of Formulations (Second Set of Experiments)

In a second set of experiments, testing of formulations detailed in Table 3 was undertaken following the procedure of Example 3, but using, as a base line, 0.25 gpt of a formulation which only includes Emulsion Polymer (EP). This is Example 4a (comparative). This is compared to Example 4b (comparative) which uses a reduced concentration of 0.1 gpt of Emulsion Polymer (EP) formulation and to a concentration of 0.1 gpt of Blends A-1, A-2 and A-3 as described in Examples 4c, 4d and 4e. Table 3 below summarises details of the formulations used in the experiments and results obtained which are represented graphically in FIG. 2.

TABLE 3

| Example No. | Formulation Identifier | Loading (gpt) | Viscosity (cP) | pH | Inversion Time (sec) | Max % Friction Reduction |
|---|---|---|---|---|---|---|
| 4a (Comparative) | Emulsion Polymer (EP) | 0.25 | 0.98 | 8.09 | 70 | 69 |
| 4b (Comparative) | Emulsion Polymer (EP) | 0.1 | 0.84 | 8.12 | 108 | 53 |
| 4c | Blend A-1 | 0.1 | 0.99 | 7.98 | 27 | 72 |
| 4d | Blend A-2 | 0.1 | 0.99 | 8.16 | 29 | 72 |
| 4e | Blend A-3 | 0.1 | 0.97 | 8.02 | 28 | 73 |

Figure 3:
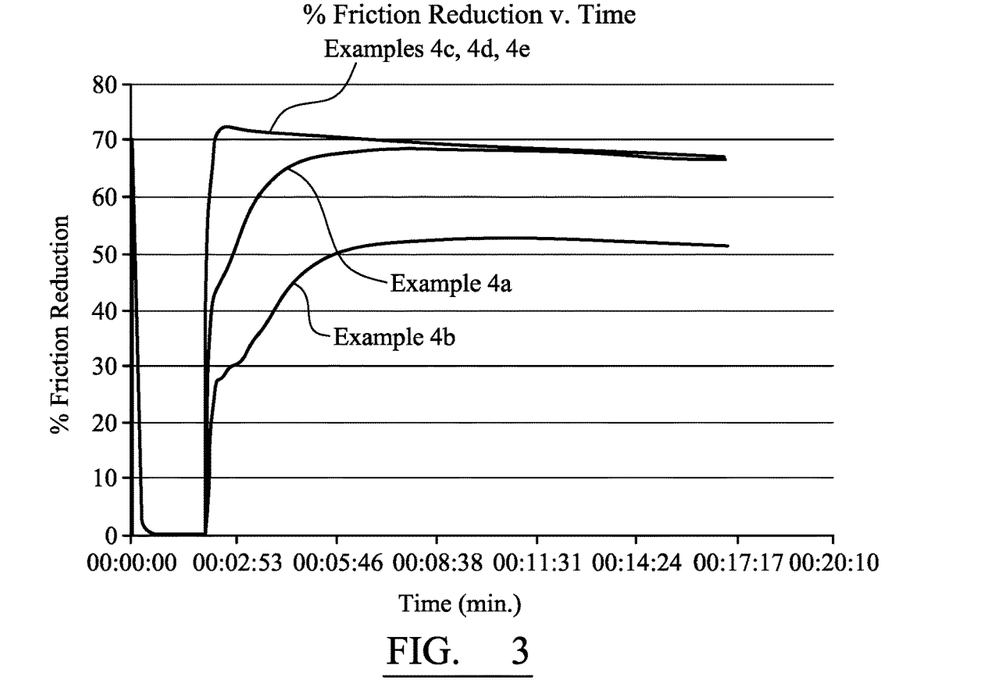
FIG. 3 is a graph of % Friction Reduction v. time for formulations described in Example 4.
Figure 4:
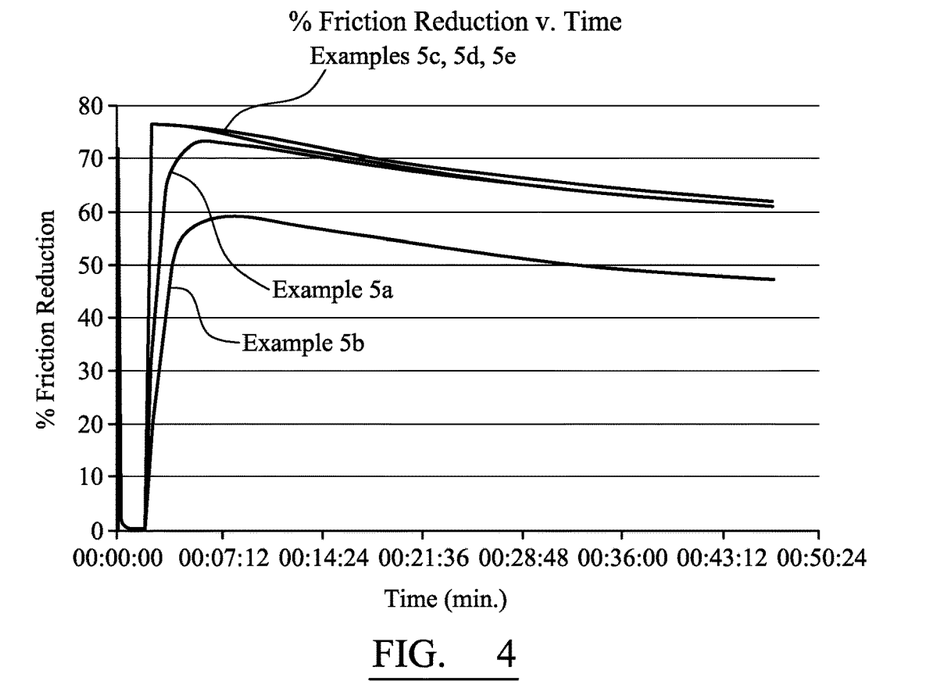
FIG. 4 is a graph of % Friction Reduction v. time for formulations described in Example 5.

The results detailed in Table 2 and FIG. 3 show, for Example 4a (which includes only the Emulsion Polymer (EP) at 0.25 gpt), a 60% maximum friction reduction and a 70 sec inversion time. When dropping the loading to 0.1 gpt of Emulsion Polymer (EP) (Example 4b), the performance suffered, with the maximum friction reduction declining to 53% and the inversion time increasing to 108 sec—both of these factors would cause high pumping pressure on a fracturing treatment. In contrast, Examples 4c, 4d and 4e show that Blends A-1, A-2 and A-3 provide 72% maximum friction reduction with an inversion time of 27-29 sec which results are superior to those for Examples 4a and 4b and even superior to Example 3a (Comparative) which uses Emulsion Polymer (EP) at the much higher loading of 0.5 gpt.

EXAMPLE 5

Assessment of Formulations (Third Set of Experiments)

The procedure of Example 3 was repeated using a higher flow rate of 10 gal/min. The results are detailed in Table 4 below and FIG. 3 and compare use of base emulsions (Emulsion Polymer (EP)) (Examples 5a and 5b) with formulations comprising blends of Emulsion Polymer (EP) and Granule Polymer (GP).

Results show use of Emulsion Polymer (EP) alone at 0.5 gpt (Example 5a) produces 72% maximum friction reduction and 106 sec inversion. Reducing the loading of Emulsion Polymer (EP) to 0.25 gpt (Example 5b) produces 59% maximum reduction and an inversion time of 141 sec. In contrast, formulations which include Emulsion Polymer (EP) and Granule Polyacrylamide (GP) at 0.25 gpt shows 73-76% maximum reduction and an inversion time of 19-28 sec, this being both more effective and more affordable than higher loadings of the base emulsion.

EXAMPLE 6

Assessment of Formulations (Fourth Set of Experiments)

In the next experiment, the performance of Blend A-2 is compared to Blend B-1. The test was conducted at a flow rate of 10 gal/min using 0.25 gpt and 0.1 gpt of the emulsions. The data is shown in Table 4. As per the table, there are slight differences between blends B-1 and A-2 at 0.25 gpt. However, Blend A-2 gave slightly better performance than blend B-1 at 0.10 gpt loading.

TABLE 4

| Example No's | Formulation Identifier | Loading (gpt) | Viscosity (cP) | pH | Inversion Time (sec) | Max % Friction Reduction |
|---|---|---|---|---|---|---|
| 6a | Blend B-1 | 0.10 | 1.0 | 8.36 | 25 | 72 |
| 6b | Blend A-2 | 0.10 | 0.96 | 8.17 | 26 | 74 |
| 6c | Blend B-1 | 0.25 | 1.16 | 8.22 | 20 | 76 |
| 6d | Blend A-2 | 0.25 | 1.18 | 8.10 | 19 | 76 |

Figure 5:
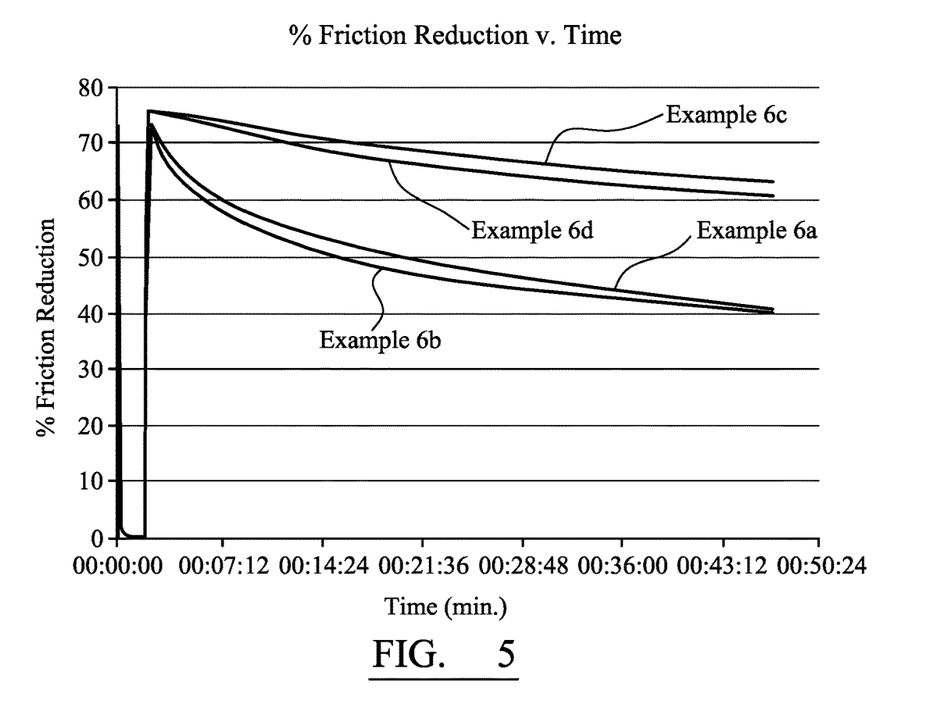
FIG. 5 is a graph of % Friction Reduction v. time for formulations described in Example 6.

Results are also summarised in FIG. 5.

As an alternative to the Granule Polyacrylamide (GP) being mixed with Emulsion Polymer (EP), the Granule Polyacrylamide (GP) may be added to other non-aqueous additives which are used in fracturing process. These may include non-aqueous guar slurries and non-aqueous cross-linking agents.

EXAMPLE 7

Use in Horizontal Well

The product blend defined in Example 1 as Blend A-1 was used on several horizontal wells as a way to achieve a significant decrease in treating pressure during the hydraulic fracturing completion process. A particular well was 12,300 ft and constructed with 5.5 inch diameter casing. The fracture design for these wells led with 8,400 gal slickwater pad followed by roughly 483,000 gal of slickwater fluid at a rate of 3,780 to 4,200 gal treating fluid per min using Blend A-1 to displace 600,000+ lbs of frac sand. The Blend A-1 product was pumped at rates ranging from 0.7 to 1.0 gal/1000 gal treating fluid, depending on treating pressure. In addition to the friction reducer, the treating fluid also comprised 0.15 gal/1000 gal organophosphonate scale inhibitor and 0.25 gal/1000 gal 50% aqueous glutaraldehyde solution as a biocide. The frac sand proppant concentration was ramped upward through the job from 0.5 to 2.25 lb/gal added.

Blend A-1 was provided in 330 gal plastic "one-way" totes plumbed from the bottom of the tote via a 2" cam lock connection. The totes were located on top of a flat-bed trailer or a tote rack which utilized the hydrostatic pressure to aid in product flow to the chemical pump. The 2 inch diameter chemical hoses were then run from the tote to a medium range Waukesha pump. A diaphragm pump was used at times to prime the chemical line, depending on distances from the chemical injection pumps. Once the line was primed, the diaphragm pump was removed. The preferable injection point for Blend A-1 was the suction side of the blender discharge pump. However, the pumping company blender did not have an available port, so Blend A-1 was pumped from the Waukesha pump into the tub portion of the pumping company's blender. The Waukesha pumps discharge the product through the 2 inch diameter chemical lines roughly 20 ft to the blender tub.

Blend A-1 was pumped as the only friction reducer and achieved the operator's goal of significant reduction of treating pressure. The treating pressures range from 7,500-9,500 psi, averaging 8,800-9,200 psi at 3,780 to 4,200 gal of treating fluid per min. This pressure at these injection rates was a significant improvement over conventional emulsion-based friction reducers, typically these having the same pressures at lower rates, such as 2,940 to 3,360 gal per min.

It will be appreciated from the above examples that use of formulations comprising Emulsion Polymer (EP) and Granule Polyacrylamide (GP), are significantly advantageous over use of Emulsion Polymer (EP) alone. For example, the time taken between initial introduction of the formulations into water and maximum friction reduction is lower than when Emulsion Polymer (EP) alone is used and the maximum % friction reduction achieved for the formulations is higher than for an equivalent loading of Emulsion Polymer (EP) alone. The aforementioned allows pumps used to inject fracturing fluids incorporating the formulations to be operated at reduced speeds and/or pressures; or greater friction reduction may be achieved for a given pump speed/pressure, thereby allowing fracture fluids to be delivered at a higher pressure at the fracture face.

Additionally, since the formulations described use less of relatively costly Emulsion Polymer (EP), friction reducer costs can be significantly reduced without the need for specialist field equipment and associated fuel and personnel costs.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A formulation (A), for use in a fracturing fluid, comprising:
   (i) a fluid (D) comprising an oil phase, wherein said fluid (D) is an inverse emulsion comprising a water-soluble polymer (B), wherein said polymer (B) includes acrylamide repeat units and is an ionic polyacrylamide, and said oil phase; and
   (ii) particles of a water-soluble polymer (C), wherein said particles of said polymer (C) are dispersed in said oil phase as solid discrete particles,
   the formulation (A) further comprising a suspending agent to facilitate suspension of said particles in the formulation, wherein said formulation (A) includes: 70-90 wt% of said fluid (D); 10-30 wt% of said particles: and 0 to 1 wt% of suspending agent.

2. The formulation (A) according to claim 1, wherein said polymer (B) includes a repeat unit which includes an optionally substituted acrylamide of formula I wherein $R^5$, $R^6$ and $R^7$ independently represent a hydrogen atom or an optionally-substituted $C_{1-4}$ alkyl group in combination with:
   a repeat unit comprising a moiety of formula II wherein the O* moiety is an O⁻ moiety or is covalently bonded to another atom or group;
   a repeat unit comprising a vinyl pyrrolidone moiety; or
   a repeat unit comprising a moiety of formula III wherein $R^1$ and $R^2$ are independently selected from a hydrogen atom and an optionally-substituted alkyl group.

3. The formulation (A) according to claim 1, wherein the inverse emulsion comprises at least 15 wt% of said oil phase; and less than 70 wt% of said oil phase; said inverse emulsion comprises at least 15 wt% and less than 50 wt% of polymer (B); and polymer (B) incorporates up to 40 wt% of water.

4. The formulation (A) according to claim 1, wherein said inverse emulsion includes 15-40 wt% of said oil phase, 15-40 wt% of polymer (B) and 15-40 wt% water.

5. The formulation (A) according to claim 1, wherein said polymer (B) includes 5-40 mol% of ionic repeat units.

6. The formulation (A) according to claim 1, wherein said polymer (B) includes a repeat unit which includes an acrylate, sulfonate or pyrrolidone moiety.

7. The formulation (A) according to claim 1, wherein said oil phase comprises a hydrophobic liquid.

8. The formulation (A) according to claim 1, wherein said water soluble polymer (C) includes one or more moieties selected from —C(O)NH2, —COO⁻, and quaternary ammonium.

9. The formulation (A) according to claim 1, wherein said polymer (C) is an ionic polyacrylamide.

10. The formulation (A) according to claim 9, wherein said particles of water soluble polymer (C) have a mean particle diameter of at least 100 μm.

11. The formulation (A) according to claim 1, wherein a ratio (X), defined as parts by weight of said fluid (D) divided by parts by weight of said particles is in the range 1-12.

12. The formulation (A) according to claim 1, wherein a ratio (Y). defined as parts by weight of polymer (B) divided by parts by weight of polymer (C) is in the range 5:1 to 1:5.

13. The formulation (A) according to claim 12, wherein a ratio (Z), defined as parts by weight of said oil phase divided by parts by weight of polymer (C) is in the range 0.1-2.0.

14. The formulation (A) according to claim 1, wherein said formulation (A) has a viscosity of less than 1000 cP.

15. A method of fracturing a subterranean formation, the method comprising contacting the formation with a fracturing fluid which comprises the formulation (A) of claim 1 in combination with an aqueous liquid.

16. A method of manufacturing a formulation (A) according to claim 1, the method comprising: (a) selecting a fluid (D) comprising an oil-phase and a water-soluble polymer (B) wherein said fluid (D) is an inverse emulsion comprising said water-soluble polymer (B) and said oil phase: and (b) contacting said a fluid (D) with particles of a water-soluble polymer (C).

17. The formulation (A) according to claim 1, wherein: said inverse emulsion includes 15-40 wt% of said oil phase. 15-40 wt% of polymer (B) and 15-40 wt% water.

18. A formulation (A), for use in a fracturing fluid, comprising:
(i) a fluid (D) comprising an oil phase, wherein said fluid (D) is an inverse emulsion comprising a water-soluble polymer (B) and said oil phase; and
(ii) particles of a water-soluble polymer (C), wherein said particles of said polymer (C) are dispersed in said oil phase as solid discrete particles, wherein:
said inverse emulsion includes 15-40 wt% of said oil phase, 15-40 wt% of polymer (B) and 15-40 wt% water; and said particles of said polymer (C) are dispersed in said oil phase and wherein said particles of water soluble polymer (C) have a mean particle diameter of at least 100 μm and said particles are in the form of powder, granules or flake.

19. A formulation (A), for use in a fracturing fluid, comprising:
(i) a fluid (D) comprising an oil phase, wherein said fluid (D) is an inverse emulsion comprising a water-soluble polymer (B) and said oil phase; and
(ii) particles of a water-soluble polymer (C), wherein said particles of said polymer (C) are dispersed in said oil phase as solid discrete particles, wherein:
said inverse emulsion includes 15-40 wt% of said oil phase, 15-40 wt% of polymer (B) and 15-40 wt% water; and said particles of said polymer (C) are dispersed in said oil phase and wherein said particles of water soluble polymer (C) have a mean particle diameter of at least 200 μm; and wherein at least 90 wt% of said particles of said water soluble polymer (C) have a diameter greater than 20 μm.

* * * * *